US008547881B2

(12) United States Patent  
Wang et al.

(10) Patent No.: US 8,547,881 B2
(45) Date of Patent: Oct. 1, 2013

(54) METHOD, APPARATUS AND SYSTEM FOR TRANSMITTING ACK RESPONSE IN BIDIRECTIONAL DATA TRANSMISSION

(75) Inventors: Yao Wang, Beijing (CN); Dongmei Lu, Beijing (CN)

(73) Assignee: IVT Technology, Inc., Beijing (CN)

( * ) Notice: Subject to any disclaimer, the term of this patent is extended or adjusted under 35 U.S.C. 154(b) by 59 days.

(21) Appl. No.: 13/319,716

(22) PCT Filed: May 13, 2010

(86) PCT No.: PCT/CN2010/000683
§ 371 (c)(1),
(2), (4) Date: Feb. 23, 2012

(87) PCT Pub. No.: WO2010/130156
PCT Pub. Date: Nov. 18, 2010

(65) Prior Publication Data
US 2012/0163246 A1    Jun. 28, 2012

(30) Foreign Application Priority Data

May 13, 2009 (CN) .......................... 2009 1 0083952

(51) Int. Cl.
*H04B 7/00* (2006.01)
*G06F 15/16* (2006.01)

(52) U.S. Cl.
USPC .......................... 370/277; 709/232

(58) Field of Classification Search
None
See application file for complete search history.

(56) References Cited

U.S. PATENT DOCUMENTS

| | | | | |
|---|---|---|---|---|
| 5,835,723 | A  * | 11/1998 | Andrews et al. | 709/226 |
| 7,000,025 | B1 | 2/2006 | Wilson | |
| 2008/0062926 | A1* | 3/2008 | Oba | 370/331 |
| 2009/0083570 | A1* | 3/2009 | Shiraishi et al. | 713/600 |

FOREIGN PATENT DOCUMENTS

CN    1886966 A    12/2006

* cited by examiner

*Primary Examiner* — Clemence Han
(74) *Attorney, Agent, or Firm* — Chainey P. Singleton; Daniel J. Chalker; Chalker Flores, LLP (57) ABSTRACT

It is provided a method, device and system for transmitting an ACK response in bidirectional data transmission. When receiving windows on both sides of a transmission are simultaneously full, no new information frames can be transmitted to the other side before the ACK timer times out. This situation is called an ACK interlock delay. In the present disclosure, a communication device actively transmits a control frame carrying an ACK response to an opposite communication terminal when it detects that the local receiving window and the receiving window of the opposite communication terminal are both full, thus avoiding ACK interlock delays, avoiding wasting time, and improving the rate of transmission and link establishment.

21 Claims, 5 Drawing Sheets

METHOD, APPARATUS AND SYSTEM FOR TRANSMITTING ACK RESPONSE IN BIDIRECTIONAL DATA TRANSMISSION

CROSS-REFERENCE TO RELATED APPLICATIONS

This application is the National Stage of International Application PCT/CN2010/000683 filed May 13, 2010, which claims priority to Chinese Application Serial No. 200910083952.3, filed May 13, 2009.

TECHNICAL FIELD

The present invention relates to communication technology, in particular to a method for transmitting an acknowledgement (ACK) response in bidirectional data transmission.

BACKGROUND ART

On Apr. 21, 2009, Bluetooth SIG (Special Interest Group) formally issued a new generation standard specification "Bluetooth Core Specification Version 3.0+High Speed", which is referred to as "Bluetooth 3.0+HS" or "Bluetooth 3.0" for short. The core of the "Bluetooth 3.0+HS" is "Generic Alternate MAC/PHY" (abbreviated as AMP). As a completely new alternate radio frequency technology, the AMP allows Bluetooth protocol stacks to dynamically choose the correct radio frequency with regard to any task, and under the premise of being compatible with the original Bluetooth 2.1+EDR, a support for high speed transmission layer such as 802.11 (WiFi) and ECMA 368 (UWB) is added.

In an age of traditional Bluetooth controller, error correction and retransmission are handled by a Bluetooth controller terminal, a host terminal can guarantee the reliability of data transmission without making any special processing; according to the Bluetooth AMP infrastructure, however, the controller of a high speed transmission medium is no longer responsible for ensuring the reliability of data transmission, the host terminal needs to make an immediate error correction and retransmission mechanism, and the RT(ReTransmission)/FC(Flow Control) mode of the traditional Bluetooth L2CAP has a design defect: when a transmitting terminal detects a package loss, all non-response frames are retransmitted forcedly, moreover, only half of a transmission window can be used to transmit data at most. The "Bluetooth 3.0+HS" specification has defined an ERTM (Enhanced Retransmission)/SM (Steaming Mode) mode of eL2CAP and made an upgrade with regard to the design defect of the original RT(retransmission)/FC (flow control) mode, with main changes including: according to HDLC protocol subsets, a control frame of SREJ (selective reject)/RNR(receive not ready) is added; a bit field "Poll-Final" is added, when detecting a frame loss, a transmitting terminal firstly inquires the receiving terminal for the current receiving state via an "RR(Poll=1)" signaling, and then decides what kind of strategy will be used for retransmission, thus avoiding additional transmission expense brought by forced and continuous frame retransmission when detecting a frame loss under an RT mode, furthermore, the transmission of a full transmission window is realized, with the speed greatly improved compared with the transmission of maximum half of transmission window in the RT mode. The ERTM mode is still a sliding window transmission mode based on the transmission response.

During the process of data transmission between the transmitting terminal and receiving terminal, an Information frame (I frame) and a Supervisory frame (S frame) are included; the I frame which is used to transmit the upper layer protocol information and some control information (for example, flow control and error control) carries a transmit sequence number and receive sequence number; the S frame is dedicated to transmitting the control information of error control and flow control, and the S frame whose main functions are to request and hang up transmission, to report state information and to confirm the receipt of I frame only carries a receive sequence number. However, an ACK (Acknowledge) response is a transmission control character used for flow control, indicating a confirmation that one or more I frames transmitted from the transmitting terminal have been received faultlessly: once the transmitting terminal receives an ACK response from the receiving terminal, the transmitting terminal will transmit the next group of I frames to the receiving terminal; if the transmitting terminal receives no ACK response, then the transmitting terminal can re-transmit the current I frame, or stop the transmission of I frame. When the ACK response has an I frame to "take", the ACK response is transmitted in a manner of I frame "carrying"; otherwise, the ACK response can only be transmitted by S frame, for example, said "RR(Poll=1)" signaling is an ACK response of S frame.

When using the ERTM transmission mode, upper layer protocols of some "request-response models", such as A2MP protocol (Alternate MAC/PHY Manager Protocol), require the use of a transmission window (receiving window and transmitting window) with a width of 1. At this time, a conventional transmission logic is: the receiving terminal directly makes a active ACK response of S frames after receiving one of I frames so as to avoid a block phenomena that I frames cannot be transmitted to the receiving terminal because the transmitting window at the transmitting terminal is full (i.e. one of I frames has been transmitted but no ACK response is returned), thus making the transmitting terminal continue transmitting the next one of the I frames. In primary optimization, considering that I frames of the upper layer protocol in the "request-response model" can often "carry" the ACK response, the ERTM transmission layer needs to create a timer of ACK response (ACK-Timer) for monitoring whether the upper layer protocol transmits those I frames "carrying" ACK responses before the ACK-Timer times out, and in this manner the number of ACK responses of S frames is reduced and the rate of transmission is improved.

However, such model only takes into account the communication path of a unidirectional "request-response" model, since two sides of communication are symmetrical in data transmission, it is very possible that each side initiates one request to the other. Under such condition of competing transmission, the receiving windows and transmitting windows of both sides are full, resulting in that no new I frame is able to be transmitted to the opposite side before the time out of the ACK-Timer which allows the transmission of the ACK response of S frames, and that the ACK response of S frames cannot be transmitted to the opposite side until the ACK-Timer is time out so as to clear the transmission block condition of the opposite side (i.e., clearing "the local receiving window is full"). The aforesaid situation that both sides cannot transmit I frames before the ACK-Timer times out is referred to as an ACK interlock delay. In such cases, both sides have to wait for the ACK-Timer's time out to recover data transmission, thus reducing the efficiency of the link establishment or transmission.

Besides, in other transmission protocols without a limitation that the width of the receiving window is 1, situations of ACK interlock delay are also possible to occur. Once ACK interlock delays happen, the rate of the transmission or the link establishment will be unavoidably affected to some extent.

SUMMARY OF THE INVENTION

The object of the present invention is to provide a method, device and system for handling ACK interlock delays during full duplex data transmission so as to avoid transmission delays caused by waiting for the ACK Timer to time out in the case of ACK interlock delays, thereby improving the rate of the link establishment or data transmission.

According to one aspect of the invention, a method for transmitting an ACK response in bidirectional data transmission is provided, said method is applied to a system including at least two communication devicees which are the first device and the second device transmitting data to each other. The first device detects if a local receiving window and a local transmitting window (i.e. a receiving window of the second device) are both full; when the first device detects that the local receiving window is full and hence is unable to continue receiving information frames from the second device, and also the first device detects that the local transmitting window (i.e. the receiving window of the second device) is already full and hence is unable to continue transmitting information frames to the second device, the first device actively transmitting a control frame carrying an ACK response to the second device.

Preferably, said first device comprises an ACK timer, after the ACK timer starts and before it times out, the first device detects if the local receiving window and the local transmitting window are both full.

Preferably, said ACK timer starts when the first device receives a first information frame from the second device for which a corresponding ACK response has not been transmitted.

Preferably, when the first device receives an information frame from the second device, and/or when the first device is to transmit an information frame to the second device, the first device detects if the local receiving window is already full and if the local transmitting window (i.e. the receiving window of the second device) is already full.

Preferably, the first device detects the number of the information frames of the first device for which corresponding ACK responses have not been transmitted to the second device and the width of the local receiving window, if the number and the width are equal, it is determined that the local receiving window is detected full and hence is unable to continue receiving information frames from the second device, otherwise, if the first device detects that the number of the local information frames for which corresponding ACK responses have not been transmitted to the second device is smaller than the width of the local receiving window, it is determined that the local receiving window is detected not full.

Preferably, the first device detects the number of the information frames of the second device for which corresponding ACK responses have not been transmitted to the first device and the width of the local transmitting window, if the number and the width are equal, it is determined that the local transmitting window (i.e. the receiving window of the second device, at this time, the width of the local transmitting window=the width of the receiving window of the second device) is detected full and is no longer able to continue transmitting information frames to the second device, otherwise, if the first device detects that the number of the information frames of the second device for which corresponding ACK responses have not been transmitted to the first device is smaller than the width of the local transmitting window, it is determined that the local transmitting window is detected not full.

This method can be applied to solving the problem of ACK interlock delay in various transmission protocols. In the case that the transmitting windows and receiving windows of the first and second devicees are in a width of 1, such method becomes much more applicable because the problem of ACK interlock delay is easier to occur.

According to another aspect of the present invention, a communication device for transmitting an ACK response in bidirectional data transmission is provided, comprising a transmission module for transmitting data between itself and an opposite communication terminal, an ACK timer is started upon receiving a first information frame from the opposite communication terminal for which a corresponding ACK response has not been transmitted. Said communication device further comprises: a detection module for detecting if the local receiving window and the local transmitting window (i.e. the receiving window of the opposite communication terminal) are both full, preferably before said ACK timer times out; and an execution module for actively transmitting a control frame carrying an ACK response to the opposite communication terminal via said transmission module when said detection module detects that the local receiving window is full and hence is unable to continue receiving information frames from the opposite communication terminal, and also detects that the local transmitting window (i.e. the receiving window of the opposite communication terminal) is full and hence is unable to continue transmitting information frames to the opposite communication terminal.

Preferably, when said transmission module receives an information frame from the opposite communication terminal, and/or said transmission module is to transmit an information frame to the opposite communication terminal, said detection module detects if the local receiving window is full and whether the local transmitting window (i.e. the receiving window of the opposite communication terminal) is full.

Preferably, said detection module is used to detect the number of local information frames for which corresponding ACK responses have not been transmitted to the opposite communication terminal and the width of the local receiving window, if the number and the width are equal, it is determined that the local receiving window is detected full and hence is unable to continue receiving information frames from the opposite communication terminal, otherwise, said detection module detects that the number of local information frames for which corresponding ACK responses have not been transmitted to the opposite communication terminal is smaller than the width of the local receiving window, then it is determined that the local receiving window is detected not full.

Preferably, said detection module is used to detect the number of information frames of the second device for which corresponding ACK responses have not been transmitted to the local device and the width of the local transmitting window (i.e. the receiving window of the opposite communication terminal), if the number and the width are equal, it is determined that the receiving window of the opposite communication terminal is detected full and hence it is unable to continue transmitting information frames to the opposite communication terminal, otherwise, said detection module detects that the number of information frames of the opposite communication terminal for which corresponding ACK responses have not been transmitted to the local device is smaller than the width of the local transmitting window, it is determined that the receiving window of the opposite communication terminal is detected not full.

In one embodiment, the local receiving window and local transmitting window (i.e. the receiving window of the opposite communication terminal) of said communication device are both in a width of 1.

According to a further aspect of the invention, a system for transmitting an ACK response in bidirectional data transmission is provided, comprising at least two communication devicees which are a first device and a second device transmitting data to each other. Said first device comprises: a transmission module for transmitting data between itself and the second device; an ACK timer which starts when receiving a first information frame from the second device for which a corresponding ACK response has not been transmitted; a detection module for detecting if the local receiving window and local transmitting window (i.e. the receiving window of the second device) are both full before said ACK timer times out; and an execution module for actively transmitting a control frame carrying an ACK response to the second device via said transmission module when said detection module detects that the local receiving window is already full and hence is unable to continue receiving information frames from the second device, and also detects that the local transmitting window (i.e. the receiving window of the second device) is already full and hence is unable to continue transmitting information frames to the second device.

Preferably, when the first device receives an information frame from the second device, and/or when the first device is to transmit an information frame to the second device, the first device detects if the local receiving window is full and if the local transmitting window (i.e. the receiving window of the second device) is full.

Preferably, the first device detects that the number of information frames of the first device for which corresponding ACK responses have not been transmitted to the second device and the width of the local receiving window, if the number and the width are equal, it is determined that the local receiving window is detected full and hence is unable to continue receiving information frames from the second device, otherwise, the first device detects that the number of information frames of the local receiving window for which corresponding ACK responses have not been transmitted to the second device is smaller than the width of the local receiving window, it is determined that the local receiving window is detected not full.

Preferably, the first device detects that the number of information frames of the second device for which corresponding ACK responses have not been transmitted to the first device and the width of the local transmitting window (i.e. the receiving window of the second device), if the number and the width are equal, it is determined that the receiving window of the second device is detected full and hence it is unable to continue transmitting information frames to the second device, otherwise, the first device detects that the number of information frames of the second device for which corresponding ACK responses have not been transmitted to the first device is smaller than the width of the local receiving window, it is determined that the receiving window of the second device is detected not full.

In one embodiment, the transmitting windows and receiving windows of the first and second devicees are both in a width of 1.

According to the present invention, under the premise that an ACK timer is adopted to reduce the number of active ACK responses of S frames during primary optimization, necessary active ACK responses of S frames are transmitted once an ACK interlock delay is detected, therefore, both sides do not block the transmission of data for the reason of waiting for the ACK timer to time out, then the problem of ACK interlock delay occurring during the full duplex data transmission is thereby solved. This invention improves the rate of data transmission between both sides of communication, such improvement of transmission rate often occurs in the link establishment of the upper layer protocol (for example, A2MP protocol) and is of great significance in improving the rate of link establishment.

DESCRIPTION OF DRAWINGS

The object and advantages of the present invention will be better understood by means of specifically describing the procedure of the invention with the aid of the drawings of the preferable embodiments, wherein.

SPECIFIC EMBODIMENTS

Figure 1:
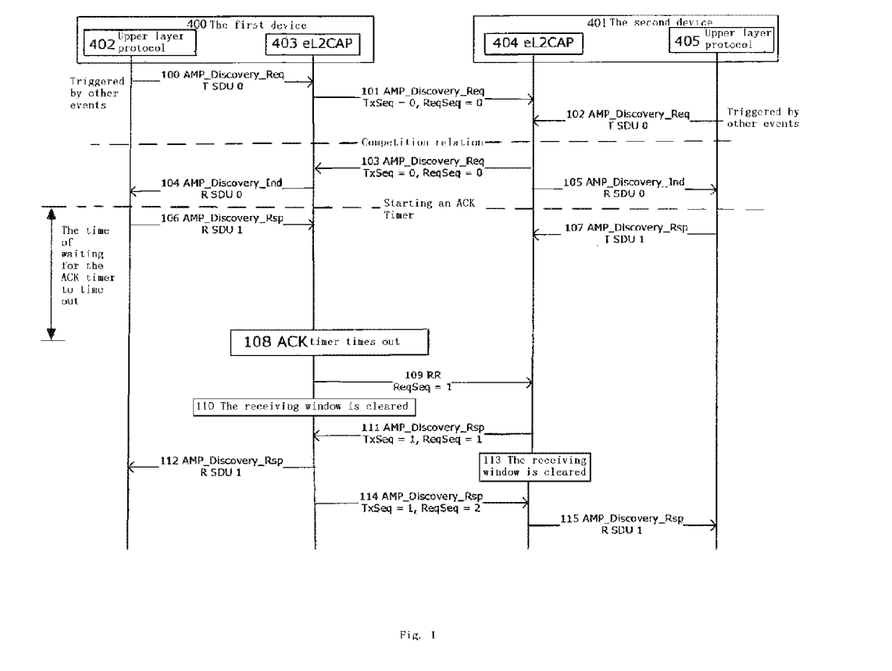
FIG. 1 is a flow diagram illustrating ACK interlock delays during full duplex data transmission.

In an embodiment of the present invention, the Bluetooth "V3.0+HS" specification containing an eL2CAP (ERTM/SM mode) is taken as an example, FIG. 1 has given a flow diagram illustrating how the ACK interlock delays occur for some upper-layer protocols (e.g. A2MP protocol) of the Bluetooth 3.0 specification during full duplex data transmission, furthermore, FIGS. 2-3 and 5-6 show respectively flow diagrams of the methods for handling ACK interlock delays during full duplex data transmission in several preferable embodiments. However, those skilled in the art should understand that the present invention is not limited to handling the problem of ACK interlock delays in the Bluetooth eL2CAP, it is also suitable for handling the problem of ACK interlock delays in other transmission protocols as well. To facilitate describing, the present invention takes the following situation as an example, i.e. the upper-layer protocols (request-response model) such as A2MP under ERTM mode require the use of a transmission window (transmitting window and receiving window) with a width of 1. The present invention is still not limited to the upper-layer protocols requiring "receiving window and transmitting window are both in a width of 1", it is also suitable for solving the problem of ACK interlock delays in other upper-layer protocols whose " transmission window is in a width greater than 1" during full duplex data transmission.

FIG. 1 is a flow diagram illustrating ACK interlock delays during full duplex data transmission under an ERTM mode of the Bluetooth 3.0 specification.

As shown in FIG. 1, data is transmitted between the first device and the second device. To facilitate describing, this embodiment only shows the eL2CAP layer and upper layer protocol (e.g. A2MP protocol) in the first device and second device separately. However, those skilled in the art should understand that the first device and second device may select to include other functional modules as well, for example, a transmission module comprising at least one of Bluetooth RF, WiFi RF and UWB RF, an input module and display module having conventional functions. The width of the receiving windows of the first device and second device is set to 1.

Triggered by other events irrelevant to an ACK response, the upper layer protocol of the first device transmits an "AMP_Discovery_Req" request to eL2CAP layer 100 of the first device, the first device marks the transmit sequence number of this request as 0 ("T SDU 0"). The eL2CAP layer of the first device transmits said "AMP_Discovery_Req" request to eL2CAP layer 101 of the second device as an I frame (the transmit sequence number TxSeq=0, the response sequence number ReqSeq=0).

Triggered by other events irrelevant to an ACK response, the upper layer protocol of the second device transmits as well an "AMP_Discovery_Req" (the transmit sequence number is marked as 0, "T SDU 0") request to eL2CAP layer 102 of the second device. The first device and second device form a competition relation. Said eL2CAP layer of the second device also transmits the "AMP_Discovery_Req" request to eL2CAP layer 103 of the first device as an I frame, and marks the transmit sequence number and response sequence number of said I frame as 0 (TxSeq=0, ReqSeq=0) respectively.

The eL2CAP layer of the first device and the eL2CAP layer of the second device transmit the received I frames of the opposite side to their upper layer protocols 104 and 105 respectively as an "AMP_Discovery_Ind" (the receive sequence number is marked as 0, "R SDU 0") response. At this time, the ACK timers of the first device and second device initiate.

Since the first device and second device respectively receive one I frame from the opposite side and fail to reply ACK, the local receiving window of the first device and the receiving window of the second device are both full. Another "AMP_Discovery_Rsp" request (wherein the transmit sequence number is marked as 1, "T SDU 1") 106, which can carry ACK and which is transmitted by the upper layer protocol of the first device to the eL2CAP layer of the first device, is impossible to be transmitted to the second device because the receiving window (i.e. the transmitting window of the first device) of the second device is already full; likewise, the "AMP_Discovery_Rsp" request (wherein the transmit sequence number is marked as 1, "T SDU 1") 107, which can carry ACK and which is transmitted by the upper layer protocol of the second device to the eL2CAP layer of the second device, is impossible to be transmitted to the first device because the receiving window of the first device is already full. In this case, since neither the first device nor the second device can transmit I frames, an ACK interlock delay is formed between them, and only after the time out of the ACK timer, an ACK response of S frame can be given to the opposite side so as to clear the transmission block condition of the opposite side (i.e. clear "the local receiving window is full").

The first device waits for the ACK timer to time out. After the ACK timer times out 108, with regard to the I frame (the transmit sequence number TxSeq=0, the response sequence number ReqSeq=0) transmitted by the second device, the eL2CAP layer of the first device actively transmits an ACK response "RR" (response sequence number ReqSeq=1) of S frame to the eL2CAP layer 109 of the second device, thus causing the eL2CAP layer of the first device to clear the local receiving window (the transmitting window of the second device being correspondingly cleared) 110. The eL2CAP layer of the second device transmits the "AMP_Discovery_Rsp" request (the transmit sequence number is marked as 1, "T SDU 1") from the upper layer protocol as an I frame carrying an ACK response 111 (the transmit sequence number TxSeq=1, the response sequence number ReqSeq=1) to the eL2CAP layer of the first device, wherein the ACK response is for the "AMP_Discovery_Req" I frame (the transmit sequence number TxSeq=0, the response sequence number ReqSeq=0) from the first device, and is transmitted by the eL2CAP layer of the first device to the upper layer protocol of the first device via "AMP_Discovery_Rsp" response (the response sequence number is marked as 1, R SDU 1) 112, such that the eL2CAP layer of the second device also clears its receiving window (the transmitting window of the first device is correspondingly cleared) 113. The eL2CAP layer of the first device transmits the "AMP_Discovery_Rsp" (the transmit sequence number is marked as 1, "T SDU 1") request of the upper layer protocol to the eL2CAP layer of the second device as an I frame carrying an ACK response (the transmit sequence number TxSeq=1, the response sequence number ReqSeq=1) 114, wherein the ACK response is for "AMP_Discovery_Rsp" I frame (the transmit sequence number TxSeq=1, the acknowledge number ReqSeq=1) from the second device, and is transmitted by the eL2CAP layer of the second device to the upper layer protocol of the second device via "AMP_Discovery_Rsp" response (the response sequence number is marked as 1, R SDU 1) 115. The first device and second device resume normal data transmission.

From the above statement, it is not difficult to see that when ACK interlock delays occur between the first device and second device, it is a must to wait for the ACK timer to time out and then transmit the ACK response of S frames. Within the period of waiting for the ACK timer to time out, two sides are unable to exchange data, thus affecting the rate of data transmission. Particularly, when an ACK interlock delay happens during link establishment, the rate of link establishment is slowed down and this directly brings inconvenience to the users.

Figure 2:
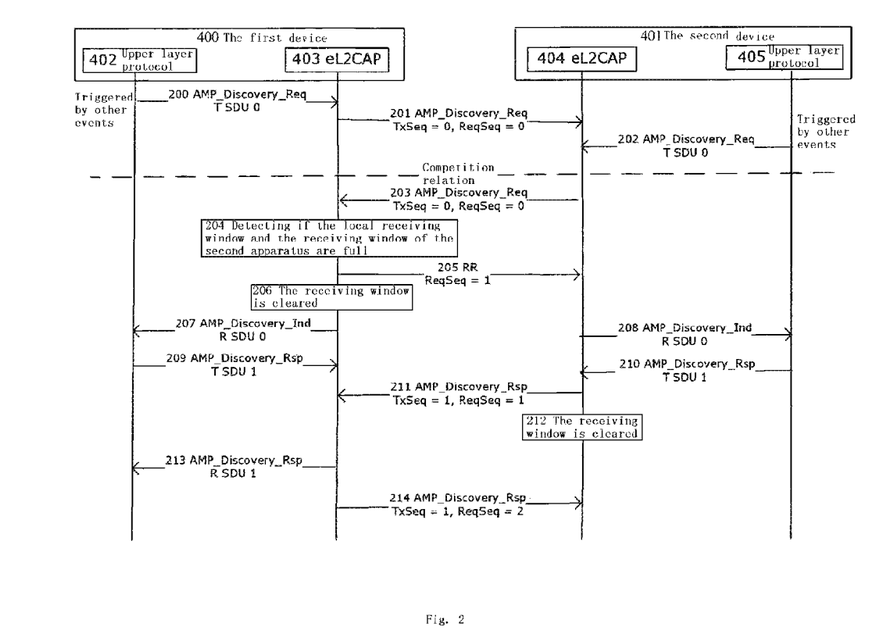
FIG. 2 is a flow diagram illustrating the method for handling ACK interlock delays during full duplex data transmission as provided according to the first preferable embodiment.

FIG. 2 is a flow diagram illustrating the method for handling ACK interlock delays during full duplex data transmission as provided according to the first preferable embodiment.

Figure 4:
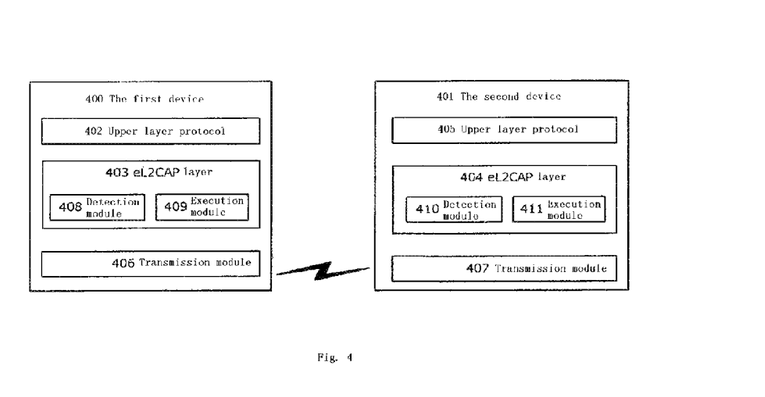
FIG. 4 is a structural diagram of the communication device and system for handling ACK interlock delays during full duplex data transmission as provided according to the preferable embodiments of the invention.

In this embodiment, data is transmitted between the first device and the second device, moreover, the receiving windows of the first device 400 and the second device 401 are in a width of 1. The structural diagram consisting of the first device 400 and second device 401 is shown in FIG. 4. The first device 400 and second device 401 each comprise upper layer protocols 402 and 405, eL2CAP layers 403 and 404, and transmission modules 406 and 407 (e.g. one or more of Bluetooth RF, WiFi RF and UWB RF) in bottom layers. Different from the existing Bluetooth device, the eL2CAP layer 403 of the first device 400 further comprises a detection module 408 for detecting if the local receiving window and the receiving window of the second device are full; and an execution module 409 for actively transmitting an S frame carrying an ACK response to the second device when the detection module 408 detects that the local receiving window is full and hence is unable to continue receiving I frame from the second device 401, and also detects that the receiving window of the second device (i.e. the local transmitting window) is full and hence is unable to continue transmitting I frame to the second device 401. The second device 401 can be the existing Bluetooth device, or the Bluetooth device having the same function as the first device 400, that is, the eL2CAP layer 404 of the second device 401 also comprises a detection module 410 and an execution module 411 having the same function as stated above.

To facilitate describing, transmission modules 406 and 407 of the first device 400 and second device 401 are omitted in FIG. 2. However, those skilled in the art should understand that data transfer between the first device 400 and second device 401 is realized by transmission modules 406 and 407.

Steps 200-202: triggered by other events irrelevant to ACK response, the upper layer protocol 402 of the first device 400 transmits an "AMP_Discovery_Req" (the transmit sequence number is marked as 0, "T SDU 0") request to the eL2CAP layer 403 of the first device 400, and the eL2CAP layer 403 of the first device 400 transmits this request to the eL2CAP layer 404 of the second device 401 as an I frame (the transmit sequence number TxSeq=0, the response sequence number ReqSeq=0). At this time, the upper layer protocol 405 of the second device 401 is triggered by other events irrelevant to ACK response to transmit as well an "AMP_Discovery_Req" (the transmit sequence number is marked as 0, "T SDU 0") request to the eL2CAP layer 404 of the second device 401, both receiving windows of the first device 400 and second device 401 are full and form a competition relation.

Steps 203-206: the eL2CAP layer 404 of the second device 401 transmits said "AMP_Discovery_Req" request to the eL2CAP layer 403 of the first device 400 as an I frame (the transmit sequence number TxSeq=0, the response sequence number ReqSeq=0). Since the first device 400 and second device 401 respectively receive one I frame from the opposite side but fail to reply ACK, the local receiving window of the first device 400 and the receiving window (i.e. the local transmitting window of the first device 400) of the second device 401 are both full. After the eL2CAP layer 403 of the first device 400 receives the I frame transmitted by the second device 401, the eL2CAP layer 403 starts detecting if the local receiving window and the receiving window of the second device 401 are full. If, as shown in FIG. 2, the eL2CAP layer 403 of the first device 400 detects that the local receiving window and the receiving window of the second device 401 are both full, then the eL2CAP layer 403 of the first device 400 actively transmitting an ACK response "RR" (the response sequence number ReqSeq=1) of S frame to the eL2CAP layer 404 of the second device 401, wherein the ACK response is a reply to the I frame (the transmit sequence number TxSeq=0, the response sequence number ReqSeq=0) transmitted by the second device, thus causing the eL2CAP layer 403 of the first device 400 to clear the local receiving window (the transmitting window of the second device 401 is correspondingly cleared).

Steps 207-210: the eL2CAP layer 403 of the first device 400 and the eL2CAP layer 404 of the second device 401 respectively transmit the received I frames of the opposite side to their upper layer protocols 402 and 405 as "AMP_Discovery_Ind" response (the response sequence number is marked as 0, "R SDU 0"). The upper layer protocol 402 of the first device 400 transmits the "AMP_Discovery_Rsp" request (the transmit sequence number is marked as 1, "T SDU 1") carrying an ACK to the eL2CAP layer 403 of the first device 400, while the upper layer protocol 405 of the second device 401 transmits the "AMP_Discovery_Rsp" request (the transmit sequence number is marked as 1, "T SDU 1") carrying an ACK to the eL2CAP layer 404 of the second device 401.

Steps 211-214: the receiving window of the first device 400 has already been cleared (i.e. the local transmitting window of the second device 401 has already been cleared), then the eL2CAP layer 404 of the second device 401 may transmit the "AMP_Discovery_Rsp" request from the upper layer protocol 405 to the eL2CAP layer 403 of the first device 400 as an I frame (the transmit sequence number TxSeq=1, the response sequence number ReqSeq=1) carrying an ACK response, wherein said ACK response is a reply to the "AMP_Discovery_Req" I frame (the transmit sequence number TxSeq=0, the response sequence number ReqSeq=0) transmitted by the first device, and is transmitted by the eL2CAP layer 403 of the first device 400 to the upper layer protocol 402 of the first device 400 via "AMP_Discovery_Rsp" response (the response sequence number is marked as 1, "R SDU 1"), such that the eL2CAP layer 404 of the second device 401 also clears the local receiving window (the transmitting window of the first device 400 is cleared correspondingly). At this time, the eL2CAP layer 403 of the first device 400 transmits the "AMP_Discovery_Rsp" (the transmit sequence number is marked as 1, "T SDU 1") request of the upper layer protocol 402 to the eL2CAP layer 404 of the second device 401 as an I frame (the transmit sequence number TxSeq=1, the response sequence number ReqSeq=2) carrying an ACK response, wherein said ACK response is a reply to the "AMP_Discovery_Req" I frame (the transmit sequence number TxSeq=1, the response sequence number ReqSeq=1) transmitted by the second device, and is transmitted by eL2CAP layer 404 of the second device 401 to the upper layer protocol 405 of the second device 401 via an "AMP_Discovery_Rsp" response (the response sequence number is marked as 1, "R SDU 1").

During the above procedure, since detection module 408 of the eL2CAP layer 403 timely detects, upon receiving an I frame data from the second device 401, that the local receiving window and the receiving window (i.e. the local transmitting window) of the second device are full, and triggers execution module 409 to actively transmitting an ACK response of S frame to the second device 401, which avoids data "block" during the waiting for the ACK timer's time out due to ACK interlock delays, thus improving the rate of transmission and link establishment.

Figure 3:
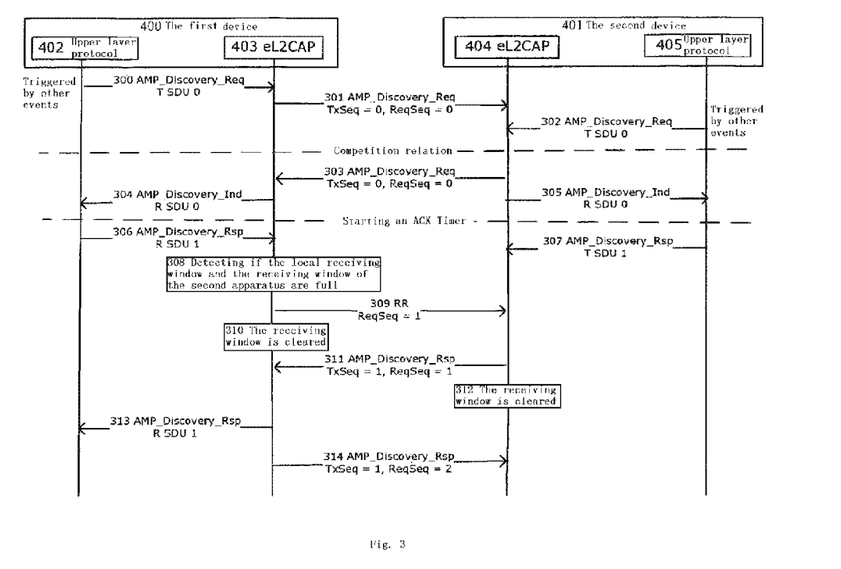
FIG. 3 is a flow diagram illustrating the method for handling ACK interlock delays during full duplex data transmission as provided according to the second preferable embodiment.

FIG. 3 is a flow diagram illustrating the method for handling ACK interlock delays during full duplex data transmission as provided according to the second preferable embodiment.

The example shown in FIG. 3 is similar to that shown in FIG. 2, the structural diagram consisting of the first device 400 and second device 401 is shown in FIG. 4 as well, the structure and function of respective functional modules are the same as those shown in FIG. 2 and details are thus omitted. The difference is, in the example shown in FIG. 3, after the ACK timer starts up and before it times out, when the eL2CAP layer 403 of the first device 400 is to transmit an I frame to the second device 401, detection module 408 starts detecting whether the local receiving window and the receiving window (i.e. the local transmitting window) of the second device are both full.

Data is transmitted between the first device 400 and second device 401. The receiving windows of the first device 400 and second device 401 have a width of 1. To facilitate describing, transmission modules 406 and 407 of the first device 400 and second device 401 are omitted in FIG. 3. However, those skilled in the art should understand that data exchange between the first device 400 and second device 401 is realized by transmission modules 406 and 407.

Steps 300-305: triggered by other events irrelevant to ACK response, the upper layer protocol 402 of the first device 400 transmits an "AMP_Discovery_Req" (its transmit sequence number is marked as 0, "T SDU 0") request to the eL2CAP layer of the first device 400, and this request is then transmitted from the eL2CAP layer 403 to the eL2CAP layer of the second device 401 as an I frame (the transmit sequence number TxSeq=0, the response sequence number ReqSeq=0). The upper layer protocol 405 of the second device 401 is also triggered by other events irrelevant to ACK response to transmit an "AMP_Discovery_Req" (its transmit sequence number is marked as 0, "T SDU 0") request to the eL2CAP layer 404 of the second device 401. The receiving windows of the first device 400 and second device 401 are full and form a competition relation. The eL2CAP layer 404 of the second device 401 also transmits this request to the eL2CAP layer 403 of the first device 400 as an I frame (the transmit sequence number TxSeq=0, the response sequence number ReqSeq=0). The eL2CAP layer 403 of the first device 400 and eL2CAP layer 404 of the second device 401 respectively transmit the received I frames of the opposite side to their upper level protocols 402 and 405 as an "AMP_Discovery_Ind" (the response sequence number is marked as 0, "R SDU 0") response. The first device 400 and second device 401 respectively receive one I frame from the opposite side but fail to reply ACK, the ACK timers of the first device 400 and second device 401 initiate. At this time, the receiving windows of the first device 400 and second device 401 are both full.

Steps 306-310: a request "AMP_Discovery_Rsp" (the transmit sequence number is marked as 1, T SDU 1) carrying ACK from the upper layer protocol 402 of the first device 400 to the eL2CAP layer 403 of the first device 400 can not be transmitted to the second device 401, since the receiving window (corresponding to the transmitting window of the first device 400) of the second device 401 is already full; likewise, a request "AMP_Discovery_Rsp" (the transmit sequence number is marked as 1, T SDU 1) carrying ACK from the upper layer protocol 405 of the second device 401 to the eL2CAP layer 404 of the second device 401 can not be transmitted to the first device 400, since the receiving window (i.e. the transmitting window of the second device 401) of the first device 400 is already full, which is that the first device 400 and the second device 401 can not transmit I frames, an ACK interlock is thereby formed between them. When the eL2CAP layer 403 of the first device 400 receives the "AMP_Discovery_Rsp" (the transmit sequence number is marked as 1, "T SDU 1") request transmitted from the upper layer protocol 402, the eL2CAP layer 403 starts detecting whether the local receiving window and the receiving window (i.e. the local transmitting window) of the second device 401 are full. When the eL2CAP layer 403 of the first device 400 detects that the local receiving window and the receiving window of the second device 401 are both full, the eL2CAP layer 403 of the first device 400 actively transmits an ACK response "RR" (the response sequence number ReqSeq=1) of S frame to the eL2CAP layer 404 of the second device 401, wherein this ACK response is for the "AMP_Discovery_Req" I frame (the transmit sequence number TxSeq=0, the response sequence number ReqSeq=0) transmitted by the second device, thus causing the eL2CAP layer 403 of the first device 400 to clear the local receiving window (corresponding to the transmitting window of the second device 401).

Steps 311-314: after the receiving window of the first device 400 is cleared, the eL2CAP layer 404 of the second device 401 may transmit "AMP_Discovery_Rsp" (the transmit sequence number is marked as 1, "T SDU 1") from the upper layer protocol 405 to the eL2CAP layer 403 of the first device 400 as an I frame (the transmit sequence number TxSeq=1, the response sequence number ReqSeq=1) carrying an ACK response, wherein said ACK response is a reply to "AMP_Discovery_Req" I frame (the transmit sequence number TxSeq=0, the response sequence number ReqSeq=0) sent by the first device, and is transmitted from the eL2CAP layer 403 to the upper layer protocol 402 of the first device 400 via "AMP_Discovery_Rsp" response (the response sequence number is marked as 1, "R SDU 1"), thus causing the eL2CAP layer 404 of the second device 401 to clear the local receiving window (i.e. the transmitting window of the first device 400) as well. At this time, the eL2CAP layer 403 of the first device 400 transmits the "AMP_Discovery_Rsp" (the transmit sequence number is marked as 1, "T SDU 1") request of the upper layer protocol 402 to the eL2CAP layer 404 of the second device 401 as an I frame (the transmit sequence number TxSeq=1, the receive sequence number ReqSeq=2) carrying an ACK response, wherein said ACK response is a reply to "AMP_Discovery_Req" I frame (the transmit sequence number TxSeq=1, the response sequence number ReqSeq=1) sent by the second device, and is transmitted from the eL2CAP layer 404 to the upper layer protocol 405 via the "AMP_Discovery_Rsp" response (the response sequence number is marked as 1, "R SDU 1").

During the above procedure, after the ACK timer starts, detection module 408 of the first device 400 detects that the local receiving window and the transmitting window (i.e. the local transmitting window) of the second device 401 are both full when preparing to send an I frame to the second device 401, which triggers the execution module 409 to actively transmit an ACK response of an S frame to the second device 401, thus reducing the time of waiting for the ACK timer' time out to respond with an S frame, and improving the rate of transmission and link establishment.

Figure 5:
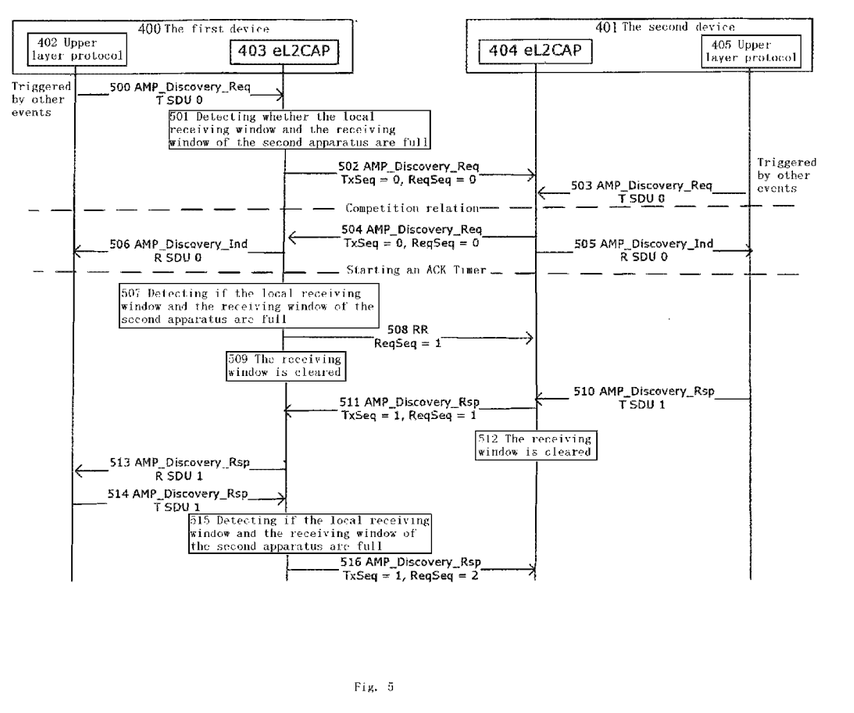
FIG. 5 is a flow diagram illustrating the method for handling ACK interlock delays during full duplex data transmission as provided according to the third preferable embodiment of the invention.

FIG. 5 is a flow diagram illustrating the method for handling ACK interlock delays during full duplex data transmission as provided according to the third preferable embodiment of the invention.

The structural diagram consisting of the first device 400 and second device 401 mentioned in the embodiments of FIG. 5 is shown in FIG. 4, the structures and functions of respective functional modules are the same as those shown in the embodiments of FIG. 2 and details are thus omitted.

Steps 500-506: triggered by other events irrelevant to ACK response, the upper layer protocol 402 of the first device 400 transmits an "AMP_Discovery_Req" (the transmit sequence number is marked as 0, "T SDU 0") request to the eL2CAP layer 403 of the first device 400. At this time, the eL2CAP layer 403 starts detecting whether the local receiving window and the receiving window (i.e. the local transmitting window) of the second device both are full; if detecting that the receiving window of the second device is not full, said request is transmitted from the eL2CAP layer 403 to the eL2CAP layer 404 of the second device 401 as an I frame (the transmit sequence number TxSeq=0, the response sequence number ReqSeq=0). The upper layer protocol 405 of the second device 401 is also triggered by other events irrelevant to ACK response to transmit an "AMP_Discovery_Req" (the transmit sequence number is marked as 0, "T SDU 0") request to the eL2CAP layer 404 of the second device 401. The transmitting windows of the first device 400 and second device 401 are full and form a competition relation. The eL2CAP layer 404 of the second device 401 also transmits said request to the eL2CAP layer 403 of the first device 400 as an I frame (the transmit sequence number TxSeq=0, the response sequence number ReqSeq=0). The eL2CAP layer 403 of the first device 400 and eL2CAP layer 404 of the second device 401 respectively transmit the received I frames of the opposite side to their upper layer protocols 402 and 405 as an "AMP_Discovery_Ind" (the response sequence number is marked as 0, "R SDU 0") response. The first device 400 and second device 401 respectively receive one I frame from each other but fail to reply ACK, so the ACK timers of the first device 400 and second device 401 start. At this time, the receiving windows of the first device 400 and second device 401 are both full.

Steps 507-509: after the first device 400 receives an I frame "AMP_Discovery_Req" (the transmit sequence number TxSeq=0, the response sequence number ReqSeq=0), the eL2CAP layer 404 starts detecting whether the local receiving window and the receiving window (i.e. the local transmitting window) of the second device are both full. In this example, the transmission windows (transmitting window and receiving window) of the first device 400 and second device 401 are both in a width of 1, therefore, at this time the eL2CAP layer 403 of the first device 400 detects that the local receiving window and the receiving window (i.e. the local transmitting window) of the second device 401 are both full, an ACK interlock is formed between the first device 400 and second device 401. The eL2CAP layer 403 actively transmits an ACK response "RR" (the response sequence number ReqSeq=1) of an S frame to the eL2CAP layer 404 of the second device 401, wherein said ACK response is for the "AMP_Discovery_Req" I frame (the transmit sequence number TxSeq=0, the response sequence number ReqSeq=0) sent by the second device 401, thus causing the eL2CAP layer 403 of the first device 400 to clear the local receiving window (corresponding to the transmitting window of the second device 401).

Steps 510-513: after the receiving window (i.e. the transmitting window of the second device 401) of the first device 400 is cleared, the eL2CAP layer 404 of the second device 401 may transmit the "AMP_Discovery_Rsp" (the transmit sequence number is marked as 1, "T SDU 1") from the upper layer protocol 405 to the eL2CAP layer 403 of the first device 400 as an I frame (the transmit sequence number TxSeq=1, the response sequence number ReqSeq=1) carrying an ACK response, wherein said ACK response is a reply to the "AMP_Discovery_Req" I frame (the transmit sequence number TxSeq=0, the response sequence number ReqSeq=0) transmitted by the first device, and then said ACK response is sent from the eL2CAP layer 403 to the upper layer protocol 402 of the first device 400 via the "AMP_Discovery_Rsp" response (the response sequence number is marked as 1, "R SDU 1"), thus causing the eL2CAP layer 404 of the second device 401 to clear its receiving window (i.e. the transmitting window of the first device 400) as well.

Steps 514-516: after receiving an "AMP_Discovery_Rsp" (the transmit sequence number is marked as 1, "T SDU 1") request of the upper layer protocol 402, the eL2CAP layer 403 of the first device 400 detects whether the local receiving window and the receiving window (i.e. the local transmitting window) of the second device 401 are both full. When the eL2CAP layer 403 detects that the receiving window of the second device 401 has already been cleared, said request is transmitted to the eL2CAP layer 404 of the second device 401 as an I frame (the transmit sequence number TxSeq=1, the receive sequence number ReqSeq=2) carrying an ACK response, wherein said ACK response is a reply to the "AMP_Discovery_Req" I frame (the transmit sequence number TxSeq=1, the response sequence number ReqSeq=1) sent by the second device, and then is sent from the eL2CAP layer 404 to the upper layer protocol 405 via the "AMP_Discovery_Rsp" response (the response sequence number is marked as 1, "R SDU 1").

During the above procedure, after the ACK timer starts, the eL2CAP layer 403 of the first device 400 detects that the local receiving window and the receiving window of the second device 401 are both full when receiving I frame from the second device 401, and then actively transmits an ACK response of an S frame to the second device 401, thus reducing the time of waiting for the ACK timer's time out to respond with S frames, and improving the rate of transmission and link establishment.

Figure 6:
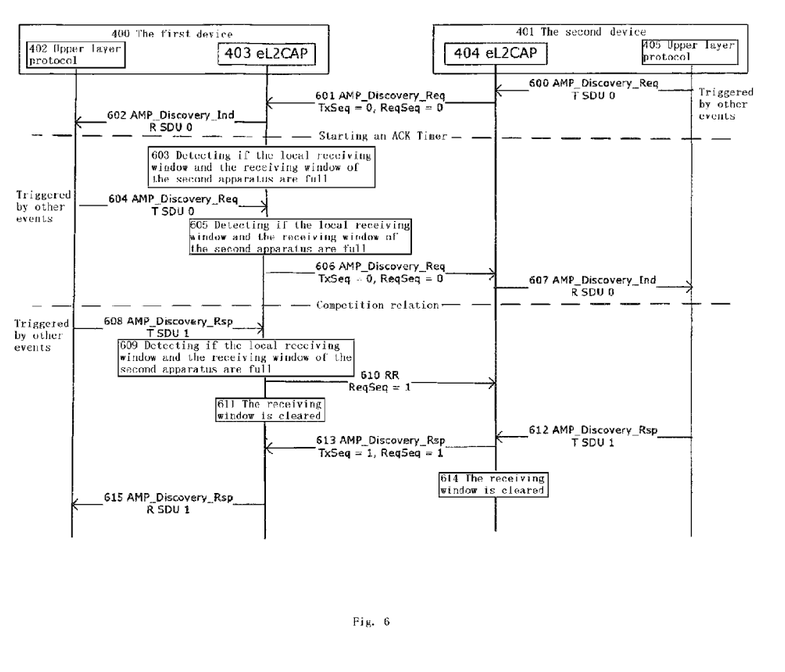
FIG. 6 is a flow diagram illustrating the method for handling ACK interlock delays during full duplex data transmission as provided according to the fourth preferable embodiment of the invention.

FIG. 6 is a flow diagram illustrating the method for handling ACK interlock delays during full duplex data transmission as provided according to the fourth preferable embodiment of the invention.

The structural diagram consisting of the first device 400 and second device 401 mentioned in the embodiments of FIG. 6 is shown in FIG. 4, the structures and functions of respective functional modules are the same as those shown in the embodiment of FIG. 2 and details are thus omitted.

Steps 600-603: triggered by other events irrelevant to ACK response, the upper layer protocol 405 of the second device 401 transmits an "AMP_Discovery_Req" (the transmit sequence number is marked as 0, "T SDU 0") request to the eL2CAP layer 404 of the second device 401, said request is then transmitted from the eL2CAP layer 405 to the eL2CAP layer 403 of the first device 400 as an I frame (the transmit sequence number TxSeq=0, the response sequence number ReqSeq=0); the eL2CAP layer 403 of the first device 400 transmits the received I frame of the opposite side to its upper layer protocol 402 as an "AMP_Discovery_Ind" (the response sequence number is marked as 0, "R SDU 0") response. The first device 400 receives one I frame from the second device 401 and fails to reply ACK, so the ACK timer of the first device 400 starts. In the meanwhile, since the first device 400 receives one I frame of the second device 401, the eL2CAP layer 403 starts detecting whether the local receiving window and the receiving window (i.e. the local transmitting window) of the second device 401 are both full. At this time, the eL2CAP layer 403 detects that the local receiving window is already full, but the receiving window of the second device 401 is not full.

Steps 604-607: the upper layer protocol 402 of the first device 400 is also triggered by other events irrelevant to ACK response to transmit an "AMP_Discovery_Req" (the transmit sequence number is marked as 0, "T SDU 0") request to the eL2CAP layer 403 of the first device 400. The eL2CAP layer 403 detects whether the local receiving window and the receiving window (i.e. the local transmitting window) of the second device 401 are both full. At this time, the eL2CAP layer 403 detects that the local receiving window is already full but the receiving window of the second device 401 is not full, then said request is sent from the eL2CAP layer 403 to the eL2CAP layer 404 of the second device 401 as an I frame (the transmit sequence number TxSeq=0, the response sequence number ReqSeq=0); the eL2CAP layer 404 of the second device 401 transmits the received I frame of the opposite side to its upper layer protocol 405 as an "AMP_Discovery_Ind" (the response sequence number is marked as 0, "R SDU 0") response. The receiving windows of the first device 400 and second device 401 are full and form a competition relation.

Steps 608-611: the upper layer protocol 402 of the first device 400 is also triggered by other events irrelevant to ACK response to transmit an "AMP_Discovery_Req"(the transmit sequence number is marked as 0, "T SDU 0") request to the eL2CAP layer 403 of the first device 400. The eL2CAP layer 403 detects whether the local receiving window and the receiving window (i.e. the local transmitting window) of the second device 401 are both full. At this time, the eL2CAP layer 403 detects that the local receiving window and the receiving window (i.e. the local transmitting window) of the second device 401 are both full, an ACK interlock is formed between the first device 400 and second device 401. The eL2CAP layer 403 actively transmits an ACK response "RR" (the response sequence number ReqSeq=1) of an S frame to the eL2CAP layer 404 of the second device 401, wherein said ACK response is for the "AMP_Discovery_Req" I frame (the transmit sequence number TxSeq=0, the response sequence number ReqSeq=0) sent by the second device, thus causing the eL2CAP layer 403 of the first device 400 to clear the local receiving window (i.e. the transmitting window of the second device 401).

Steps 612-615: after the receiving window (i.e. the transmitting window of the second device 401) of the first device 400 is cleared, the eL2CAP layer 404 of the second device 401 may transmit the "AMP_Discovery_Rsp" (the transmit sequence number is marked as 1, "T SDU 1") from the upper layer protocol 405 to the eL2CAP layer 403 of the first device 400 as an I frame (the transmit sequence number TxSeq=1, the response sequence number ReqSeq=1) carrying an ACK response, wherein the ACK response is a reply to the "AMP_Discovery_Req" I frame (the transmit sequence number TxSeq=0, the response sequence number ReqSeq=0) sent by the first device, and then is transmitted from the eL2CAP layer 403 to the upper layer protocol 402 of the first device 400 via "AMP_Discovery_Rsp" response (the response sequence number is marked as 1, "R SDU 1"), thus causing the eL2CAP layer 404 of the second device 401 to clear its receiving window (i.e. the transmitting window of the first device 400) as well.

During the above procedure, after the ACK timer starts, the eL2CAP layer 403 of the first device 400 detects that the local receiving window and the receiving window of the second device 401 are both full when transmitting the I frame to the second device 401, and then actively transmits an ACK response of an S frame to the second device 401, thus reducing the time of waiting for the ACK timer's time out to respond with S frames, and improving the rate of transmission and link establishment.

Although the present invention is illustrated and described with reference to its preferable embodiments, those ordinarily skilled in the art should understand that various changes in form and details could be made without deviating from the spirit and range of the invention as defined in the appended Claims.

The invention claimed is:

1. A method for transmitting an ACK response in bidirectional data transmission, applied to a system including at least two communication devices which are a first device and a second device transmitting data to each other, comprising:
   detecting, by the first device, if a local receiving window and a receiving window of the second device are both full; and
   transmitting actively, by the first device, a control frame carrying an ACK response to the second device when the first device detects that the local receiving window is full and is unable to continue receiving information frames from the second device, and when the first device detects that the receiving window of the second device is full and transmitting information frames to the second device is unable to continue.

2. The method of claim 1, wherein said first device comprises an ACK timer, and after said ACK timer starts and before said ACK timer times out, performs a detection on if the local receiving window and the receiving window of the second device are both full.

3. The method of claim 2, wherein the first device performs the detection on if the local receiving window and the receiving window of the second device are full when the first device receives an information frame from the second device, and/or when the first device is to transmit an information frame to the second device.

4. The method of claim 1, wherein the local receiving window of the first device and the receiving window of the second device are both with a width of 1.

5. The method of claim 1, wherein the first device detects the number of local information frames for which corresponding ACK responses have not been transmitted to the second device and the width of the local receiving window, and if the number and the width are equal, it is determined that the local receiving window is detected full.

6. The method of claim 1, wherein the first device detects the number of information frames of the second device for which corresponding ACK responses have not been transmitted to the first device and the width of the receiving window of the second device,
   and if the number and the width are equal, it is determined that the receiving window of the second device is detected full.

7. The method of claim 1, wherein said first device and said second device transmit data to each other according to an ERTM transmission mode.

8. A communication device for transmitting an ACK response in bidirectional data transmission, comprising a transmission module for transmitting data between itself and an opposite communication terminal, characterized in that said communication device further includes:
   a detection module for detecting if a local receiving window and a receiving window of the opposite communication terminal are both full; and
   an execution module for actively transmitting a control frame carrying an ACK response to the opposite communication terminal via said transmission module when said detection module detects that the local receiving window is full and is unable to continue receiving information frames from the opposite communication terminal, and that the receiving window of the opposite communication terminal is full and transmitting information frames to the opposite communication terminal is unable to continue.

9. The communication device of claim 8, wherein said communication device comprises an ACK timer, and said detection module is configured to perform a detection on if the local receiving window and the receiving window of the opposite communication terminal are both full after said ACK timer starts and before said ACK timer times out.

10. The communication device of claim 9, wherein when said transmission module receives an information frame from the opposite communication terminal, and/or when said transmission module is to transmit an information frame to the opposite communication terminal, said detection module performs a detection on if the local receiving window and the receiving window of the opposite communication terminal are both full.

11. The communication device of claim 8, wherein said local receiving window and the receiving window of the opposite communication terminal are both with a width of 1.

12. The communication device of claim 8, wherein said detection module is used to detect the number of local information frames for which corresponding ACK responses have not been transmitted to the opposite communication terminal and the width of the local receiving window, and if the number and the width are equal, it is determined that the local receiving window is detected full.

13. The communication device of claim 8, wherein said detection module is used to detect the number of information frames of the opposite communication terminal for which corresponding ACK responses have not been transmitted and the width of the receiving window of the opposite communication terminal, and if the number and the width are equal, it is determined that the receiving window of the opposite communication terminal is detected full.

14. The communication device of claim 8, wherein said communication device and said opposite communication terminal transmit data to each other according to an ERTM transmission mode.

15. A system for transmitting an ACK response in bidirectional data transmission, comprising at least a first device and a second device, said first device and second device transmitting data to each other, wherein said first device includes:
a transmission module for transmitting data between itself and the second device;
a detection module for detecting if a local receiving window and a receiving window of the second device are full; and
an execution module for actively transmitting a control frame carrying an ACK response to the second device via said transmission module when said detection module detects that the local receiving window is full and is unable to continue receiving information frames from the second device, and that the receiving window of the second device is full and transmitting information frames to the second device is unable to continue.

16. The system of claim 15, wherein said first device comprises an ACK timer, said detection module is configured to perform a detection on if the local receiving window and the receiving window of the second device are both full after said ACK timer starts and before said ACK timer times out.

17. The system of claim 15, wherein when the first device receives an information frame from the second device, and/or when the first device is to transmit an information frame to the second device, said detection module performs a detection on if the local receiving window and the receiving window of the second device are both full.

18. The system of claim 15, wherein the local receiving window of the first device and the receiving window of the second device are both with a width of 1.

19. The system of claim 15, wherein the first device detects the number of local information frames for which corresponding ACK responses have not been transmitted to the second device and the width of the local receiving window, if the number and the width are equal, it is determined that the local receiving window is detected full.

20. The system of claim 15, wherein the first device detects the number of information frames of the second device for which corresponding ACK responses have not been transmitted to the first device and the width of the receiving window of the second device, if the number and the width are equal, it is determined that the receiving window of the second device is detected full.

21. The system of claim 15, wherein said first device and second device transmit data to each other according to an ERTM transmission mode.

* * * * *